United States Patent Office 3,035,061
Patented May 15, 1962

3,035,061
2,6-DIAMINOPYRIDINE-3,5-DICARBOXYLIC ACID AMIDES
Rodolphe Vonderwahl, Riehen, near Basel, Switzerland, assignor to J. R. Geigy A.-G., Basel, Switzerland
No Drawing. Filed Feb. 10, 1961, Ser. No. 88,267
Claims priority, application Switzerland Feb. 12, 1960
8 Claims. (Cl. 260—295.5)

It has been found that solutions of certain derivatives of 2,6-diaminopyridine-3,5-dicarboxylic acids are distinguished by a vivid violet to blue fluorescence. These new substances, therefore, are valuable auxiliaries for the solution of technical problems to do with the transformation of U.V. light, for example for the marking of substances, particularly for use in crack detection and for the brightening of synthetic substances such as polyvinyl chloride. The invention also concerns a process for the production of 2,6-diaminopyridine-3,5-dicarboxylic acids in good yields as well as of their fluorescent derivatives.

The substances obtained according to the invention correspond to the general Formula I

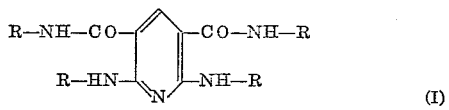

(I)

wherein R represents a lower alkyl radical such as the methyl, ethyl, n-propyl, isopropyl, n-butyl, isobutyl, tert. butyl, n-amyl, n-hexyl group.

The substances of the general Formula I according to the invention are obtained by condensing, possibly in the presence of inert organic diluents, in an acid medium, preferably in a strong inorganic acid, 1,3-dilower alkyl-4-amino uracils with an N-di-lower alkyl formamide to form a 2,3:6,5-bis-[1',3'-di-lower alkyl-(2',4'-dioxo-1',2', 3',4'-tetrahydro)-1',4' - pyrimido] - pyridine (II) and saponifying this compound in an alkaline medium.

In the condensation in the first step, ammonia, secondary amine and water are split off and in the saponification, carbon dioxide is split off as illustrated by the following scheme of reactions:

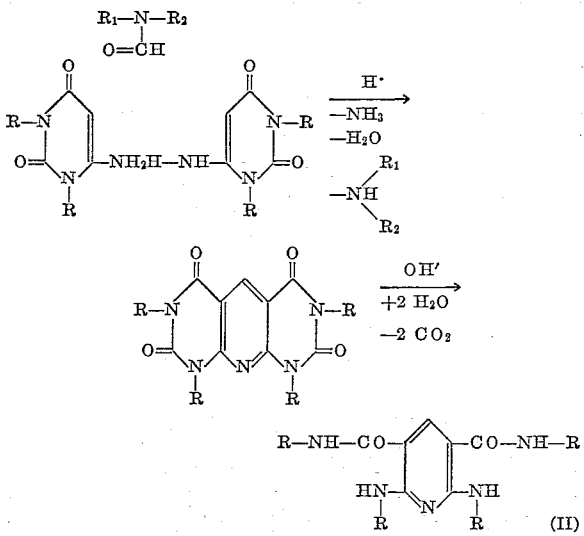

4-amino uracils usable according to the invention are substituted by low alkyl groups containing up to and including 6 carbon atoms, preferably methyl, ethyl and n-propyl groups.

Preferably N-dimethyl formamide, but also N-diethyl formamide can be used as N-di-lower alkyl formamide. Principally, strong inorganic or complex acids are used as acid condensing agents, particularly oxygen acids; preferably chlorosulphonic acid; then also sulphuric acid, phosphoric acid are used. However, also hydrogen fluoride, hydrogen chloride or hydrogen bromide can be used, particularly in the presence of metalloid halides or metal halides such as, e.g., borofluoride, zinc chloride, zinc bromide which, in the reaction form hydrohalic acids.

Halogenated alkanes such as carbon tetrachloride or tetrachloroethylene can be used, for example, as inert organic solvents and diluents.

The condensation reaction can be performed in steps or, more expediently, in one batch. A particularly favourable method of performing the condensation consists in dissolving an amino uracil in excess dimethyl formamide and then slowly and gradually adding the acid condensing agent while stirring well at a suitable temperature. For example, at least a half molar amount of chlorosulphonic acid is used, possibly diluted in an inert solvent, whereupon the reaction is expediently completed at a higher temperature.

Often excellent yields of more than 85% of the theoretical of 2,3:6,5-bis-[(2',4''-dioxo-1',2',3',4'-tetrahydro)-1',4'-pyrimido]-pyridines are obtained by this method direct in a very pure form.

The alkaline saponification of the intermediate products of Formula II is performed advantageously with the hydroxides of the alkali metals in aqueous, inert aqueous/organic, or in alcoholic solution. In this way, the amides of 2,6-diaminopyridine-3,5-dicarboxylic acids are obtained.

Further details will be seen from the following examples which serve to illustrate the invention. Parts are given therein as parts by weight and the temperatures are in degrees centigrade. The relationship of parts by weight to parts by volume is as that of grammes to cubic centimetres.

*Example 1*

2,6-bis-methylaminopyridine - 3,5 - dicarboxylic acid-bis-methylamide of the formula:

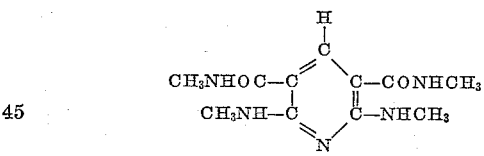

155 parts of 1,3-dimethyl-4-amino uracil are added to 250 parts of dimethyl formamide. 58 parts of chlorosulphonic acid are added dropwise to the mixture while externally cooling with a mixture of ice-sodium chloride and while stirring well. The whole is stirred for 1 hour at room temperature and is then refluxed for half an hour at about 155° C. The solution is then cooled and, by the gradual addition of water, white crystals are precipitated which are filtered off. The filter residue is washed well with water and dried. 133 parts of 2,3:6,5-bis-[(1',3'-dimethyl - 2',4' - dioxo - 1',2',3',4' - tetrahydro)-1',4'-pyrimido]-pyridine are obtained as white crystals which melt at 307–309°. This corresponds to a yield of 88% of the theoretical calculated on the initial amount of 1,3-dimethyl-4-amino uracil. A preparation for analysis recrystallised from dimethyl formamide having the melting point of 308–310° gave the following results for $C_{13}H_{13}N_5O_4$ of molecular weight 303.27:

|  | C, percent | H, percent | N, percent |
|---|---|---|---|
| Calculated | 51.48 | 4.32 | 23.09 |
| Found | 51.56 | 4.27 | 23.13 |

To saponify the 2,3:6,5-bis-[1',3'-dimethyl-2',4'-dioxo-1',2',3',4'-tetrahydro)-1',4'-pyrimido]-pyridine, 245 parts thereof are refluxed for 2½ hours with 2500 parts of 10% caustic soda lye and 40 parts of ethanol. The reaction mixture is cooled and the precipitate is filtered off under suction, washed neutral with water and dried. 185 parts of 2,6-bis-methylamino-pyridine-3,5-dicarboxylic acid-bis-methylamide are obtained as white crystals which melt at 270–271° which have an intensive fluorescence.

On elementary analysis of a preparation recrystallised from ethanol having the melting point of 272–273°, the following values were obtained for $C_{11}H_{17}N_5O_2$ (molecular weight=251.29):

|  | C, percent | H, percent | N, percent |
| --- | --- | --- | --- |
| Calculated | 52.57 | 6.82 | 27.87 |
| Found | 52.97 | 6.93 | 27.71 |

If in the first paragraph of the above example, 55 parts of concentrated sulphuric acid are used instead of chlorosulphonic acid, then on refluxing for 1½ hours, also a good yield of 2,3:6,5-bis-[(1',3'-dimethyl-2',4'-dioxo-1',2',3',4'-tetrahydro)-1',4'-pyrimido]-pyridine is obtained. It is in the form of white crystals which melt at 306–308°. A similar result is attained if, instead of chlorosulphonic acid, a mixture consisting of 29 parts of chlorosulphonic acid and 25 parts of concentrated sulphuric acid is used.

In addition, if the chlorosulphonic acid is replaced by 70 parts of 85% phosphoric acid or by a mixture consisting of 23 parts of 100% formic acid and 20 parts of concentrated sulphuric acid, then 2,3:6,5-bis-[(1',3'-dimethyl - 2',4'-dioxo - 1',2',3',4' - tetrahydro) - 1',4'-pyrimido]pyridine is obtained as yellowish white crystals which melt at 283–286°. White crystals which melt at 306–308° are obtained by digesting with hot glacial acetic acid.

2,3:6,5 - bis - [(1'3' - dimethyl-2',4'-dioxo-1',2',3',4'-tetrahydro)-1',4'-pyrimido]-pyridine can also be produced very well by a step-wise process as follows: 155 parts of 1,3-dimethyl-4-amino uracil are suspended in 1000 parts of carbon tetrachloride and 150 parts of chlorosulphonic acid are slowly added while cooling externally with a mixture of ice and sodium chloride. The mixture is stirred for 2 hours at room temperature and is then refluxed for another 2 hours. It is then cooled, the precipitate is filtered off, washed with carbon tetrachloride and dried in vacuo. 155 parts of 1,3-dimethyl-4-amino uracil dissolved in 350 parts of dimethyl formamide are added to the brownish coloured powder and the solution is refluxed for 1 hour. It is cooled, the solution is diluted with water and the precipitate is filtered off. The precipitate is well washed with water and then dried. 245 parts of 2,3:6,5-bis-[(1',3'-dimethyl-2',4'-dioxo-1',2',3',4'-tetrahydro)-1',4'-pyrimido]-pyridine are obtained in the form of white crystals which melt at 306–308°, which corresponds to a yield of 81% of the theoretical.

*Example 2*

2,6 - bis - ethylaminopyridine - 3,5 - dicarboxylic acid-bis-ethylamide of the formula

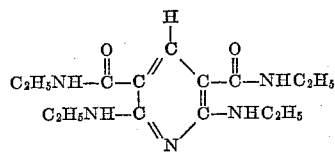

183 parts of 1,3-diethyl-4-amino uracil are added to 300 parts of dimethyl formamide. 58 parts of chlorosulphonic acid are slowly added to the mixture while stirring and externally cooling with a mixture of ice and sodium chloride. The whole is stirred first for 1 hour at room temperature and is then refluxed for another hour at about 150–160° C. It is then cooled, the solution is diluted with water and the precipitate, which is crystalline, is filtered off. It is well washed and then dried.

132 parts of 2,3:6,5-bis-[(1',3'-diethyl-2',4'-dioxo-1',2',3',4'-tetrahydro)-1',4'-pyrimido]-pyridine are obtained in the form of a white crystal powder. Elementary analysis of a preparation recrystallised from glacial acetic acid consisting of small white needles which melt at 208–210°, gave the following values for $C_{17}H_{21}N_5O_4$ of molecular weight 359.38:

|  | C, percent | H, percent | N, percent |
| --- | --- | --- | --- |
| Calculated | 56.81 | 5.89 | 19.49 |
| Found | 56.78 | 5.98 | 19.28 |

To saponify 2,3:6,5-bis-[(1',3'-diethyl-2',4'-dioxo-1',2',3',4'-tetrahydro) - 1',4' - pyrimido]-pyridine, if 36 parts thereof are refluxed for 5 hours with 900 parts of 2 N-caustic soda lye and 20 parts of ethanol, cooled, the precipitate is filtered, washed neutral and dried, then a good yield of white crystals is obtained which, recrystallised from ethanol, melt at 172–173°. According to elementary analysis, the product is 2-ethylamino-3-N-ethylcarbamyl-6,5-[(1',3' - diethyl - 2',4' - dioxo - 1',2',3',4'-tetrahydro)-1',4'-pyrimido]-pyridine of the formula $C_{16}H_{23}N_5O_3$ (molecular weight 333.28):

|  | C, percent | H, percent | N, percent |
| --- | --- | --- | --- |
| Calculated | 57.64 | 6.95 | 21.01 |
| Found | 57.65 | 6.75 | 20.94 |

On refluxing for 14 hours 19 parts of 2-ethylamino-3-N-ethylcarbamyl - 6,5 - [(1',3' - diethyl - 2',4'-dioxo-1',2',3',4'-tetrahydro)-1',4'-pyrimido]-pyridine with 20 g. of potassium hydroxide dissolved in 200 parts of ethanol, distilling off the ethanol, cooling and diluting with water, then a precipitate is obtained which is filtered off, washed neutral and dried. Yield: 16 parts of 2,6-bis-ethylaminopyridine - 3,5 - dicarboxylic acid-bis-ethylamide; white lamina which melt at 238–240° and fluoresce violet. Elementary analysis gave the following values for $C_{15}H_{25}N_5O_2$ (molecular weight=307.39):

|  | C, percent | H, percent | N, percent |
| --- | --- | --- | --- |
| Calculated | 58.61 | 8.20 | 22.79 |
| Found | 58.60 | 8.12 | 22.73 |

*Example 3*

2,6 - bis-n-propylaminopyridine-3,5 - dicarboxylic acid-bis-n-propylamide of the formula

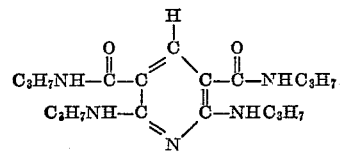

170 parts of 1,3-di-n-propyl-4-amino uracil are partly dissolved in 200 parts of dimethyl formamide. 47 parts of chlorosulphonic acid are added within 1 hour while cooling externally with a mixture of ice and sodium chloride and stirring. The mixture is then refluxed for 1 hour, cooled, diluted with water and the precipitate formed is filtered off and washed well with water. After drying, 141 parts of 2,3:6,5-bis-[(1',3'-di-n-propyl-2',4'-dioxo-1',2',3',4'-tetrahydro)-1',4' - pyrimido]-pyridine are obtained which corresponds to a yield of 85% of the theoretical. On recrystallising from glacial acetic acid, white fibrous crystals are obtained. A product for analysis recrystalllised from glacial acetic acid which melts at 154–156° gave the following values for $C_{21}H_{29}N_5O_4$ (molecular weight=415.48):

|  | C, percent | H, percent | N, percent |
|---|---|---|---|
| Calculated | 60.70 | 7.04 | 16.86 |
| Found | 60.60 | 7.01 | 16.93 |

To saponify, 23 parts of 2,3:6,5-bis-[(1′,3′-di-n-propyl-2′,4′-dioxo-1′,2′,3′,4′-tetrahydro)-1′,4′-pyrimido]-pyridine are refluxed for 14 hours with a solution of 30 parts of potassium hydroxide in 200 parts of ethanol, the ethanol is then distilled off, the residue is cooled, diluted with water, the precipitate is filtered off, washed neutral and dried. 11 parts of 2,6-bis-n-propylamino-pyridine-3,5-dicarboxylic acid-bis-n-propylamide are obtained as white fibre-like crystals which fluoresce violet.

A product for analysis recrystallised from ethanol which melts at 235–237° gave the following values for $C_{19}H_{33}N_5O_2$ (molecular weight=363.49):

|  | C, percent | H, percent | N, percent |
|---|---|---|---|
| Calculated | 62.78 | 9.15 | 19.27 |
| Found | 62.94 | 9.22 | 18.93 |

What I claim is:
1. Process for the production of 2,6-bis-(N-monolower alkylamino) - pyridine-3,5-dicarboxylic acid-bis-N-monolower alkylamide which comprises condensing, in an acid medium, 1,3-dilower alkyl-4-amino uracil with N,N-dilower alkyl formamide and saponifying, in alkaline medium, the resultant 2,3:6,5-bis-[(1′,3′-dilower alkyl-2′,4′-dioxo-1′,2′,3′,4′-tetrahydro)-1′,4′-pyrimido]-pyridine.

2. Process according to claim 1 wherein the N,N-dilower alkyl formamide is N,N-dimethyl formamide.

3. Process according to claim 2 wherein the condensation is carried out in the presence of a strong inorganic oxygen acid.

4. Process according to claim 2 wherein the condensation is carried out in the presence of chlorosulphonic acid.

5. A compound of the formula

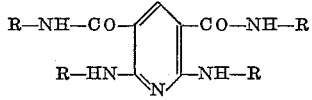

wherein R is a lower alkyl group.

6. A compound of the formula

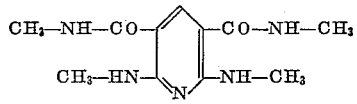

7. A compound of the formula

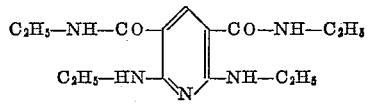

8. A compound of the formula

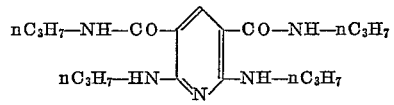

References Cited in the file of this patent
FOREIGN PATENTS
156,401 Australia _____ Aug. 30, 1951
OTHER REFERENCES
Meyer et al.: Monatschefte für Chemie, vol. 36, pages 731–49 (1915).